United States Patent [19]

Nagai et al.

[11] Patent Number: 4,685,862
[45] Date of Patent: Aug. 11, 1987

[54] INDUSTRIAL ROBOT

[75] Inventors: Masahide Nagai; Kazutoshi Yokose, both of Tokyo, Japan

[73] Assignee: Seiko Instruments Inc., Tokyo, Japan

[21] Appl. No.: 764,674

[22] Filed: Aug. 9, 1985

[30] Foreign Application Priority Data

Aug. 17, 1984 [JP] Japan .................................. 59-171035

[51] Int. Cl.$^4$ .............................................. B25J 9/22
[52] U.S. Cl. .................................. 414/744 A; 901/4; 901/5; 901/47
[58] Field of Search ............... 414/1, 735, 730, 744 R, 414/744 B, 744 C, 786; 901/4, 5, 9, 47, 10, 42, 41

[56] References Cited

U.S. PATENT DOCUMENTS

| | | | |
|---|---|---|---|
| 3,986,007 | 10/1976 | Ruoff, Jr. ............................. | 901/9 X |
| 4,380,696 | 4/1983 | Masaki ................................. | 414/1 X |
| 4,492,847 | 1/1985 | Masaki et al. ....................... | 901/9 X |
| 4,532,405 | 7/1985 | Corby, Jr. et al. ................. | 901/9 X |

OTHER PUBLICATIONS

"X-Y-$\theta$ Manipulator", IBM Disclosure Bulletin, vol. 21, No. 7, Dec. 1978.

*Primary Examiner*—Robert J. Spar
*Assistant Examiner*—Donald W. Underwood
*Attorney, Agent, or Firm*—Bruce L. Adams; Van C. Wilks

[57] ABSTRACT

An industrial robot having a controllably movable arm is taught position data for controlling the movable of the arm. A support member is provided on the arm and has a through-hole therein. First, an optical magnifying devices inserted into the through-hole for aligning the arm in a proper position so as to teach the position data to the industrial robot. Thereafter, the optical magnifying device is removed from the through-hole, and a manipulating device is inserted into the same through-hole. The manipulating device is movable together with the arm according to the taught data for sequentially manipulating workpieces.

18 Claims, 4 Drawing Figures

INDUSTRIAL ROBOT

BACKGROUND OF THE INVENTION

This invention relates to an industrial robot which is arranged to undergo an accurate assembling operation.

Conventionally, in these types of industrial robots, it is determined by watching a work from sides whether the work grasped by a gripping member is identically positioned to a assembly position or not in teaching operation of the industrial robots.

However, these conventional methods to determine the position of the work by watching the work from sides have disadvantages that it is impossible to execute a minute determination of the position and that also it needs to detect and correct the position from both sides which are about orthogonal each other in order to accurately correct the x, y coordinate positions and thereby to undergo the teaching operation.

SUMMARY OF THE INVENTION

This invention is accomplished in view of the foregoing problems, wherein it executes a position correction and a position teaching, by providing a holding member in which a gripping member or microscope or the like is detouchably mounted and by making it possible to attach an enlarging member or an optical magnifying device such as a microscope or the like to the position for attaching the gripping member so as to watch and detect an enlarged or magnified image view.

Additionally, also in case that the industrial robot carries out the determination of the workpiece position by watching and/or correcting the position remotely from the industrial robot by attaching an optical signal transmitting device instead of the enlarging member and that it carries out an automatic correction by executing information processing instead of watching, the same effects will be obtained therefrom.

DETAILED DESCRIPTION OF PREFERRED EMBODIMENTS

Hereinafter, the embodiments of this invention will be detailedly described in conjunction with the drawings.

Figure 1:
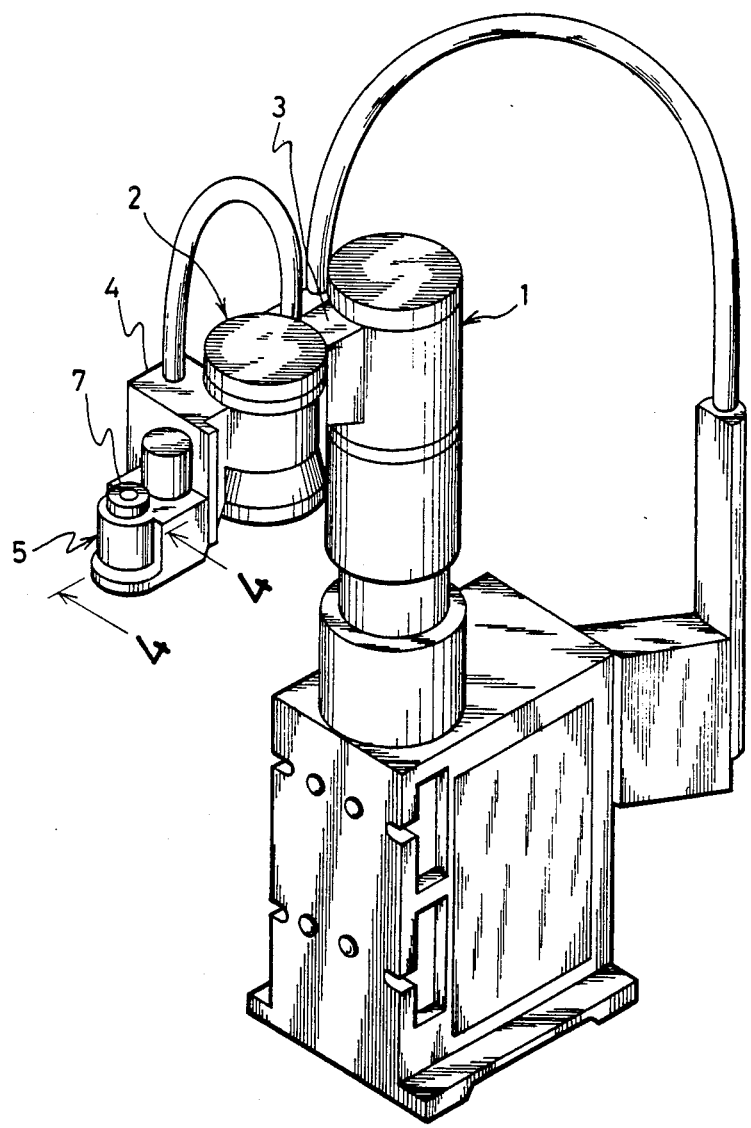
FIG. 1 illustrates a perspective view of an industrial robot which is applicable to this invention.
Figure 4:
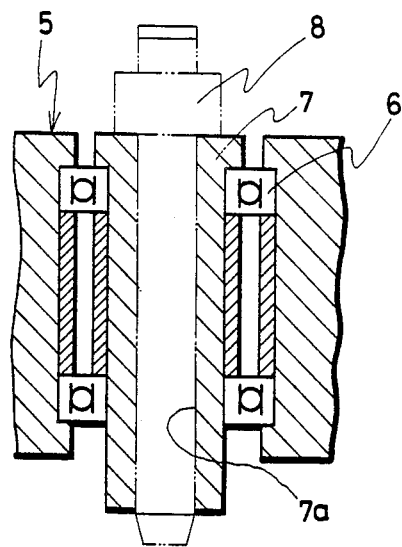
FIG. 4 shows an enlarged cross-section taken along line 4—4 of FIG. 1.

FIG. 1 illustrates an appearance of an industrial robot of an embodiment of this invention, wherein reference numeral 1 designates a first articulated portion, numeral 2 designates a second articulated portion, numeral 3 designates a first arm which is rotatable around the center of the first articulated portion, and numeral 4 designates a second arm which is rotatable around the center of the second articulated portion. On an extremity of the second arm, there is secured a support member 5 so as to be capable of holding a gripping apparatus for grasping a work, and on the support 5, there is arranged a holding member 7 which is rotatably inserted via bearings 6 as shown in FIG. 4 which is a cross-sectional view taken along a 4—4 line of FIG. 1. This holding member 7 is connected with a motor (not shown) by reduction mechanism. Therefore, the holding member is able to be rotationally driven at its convenience by means of a controller (not shown). In addition, the holding member 7 has a through-hole 7a therein.

Figure 2:
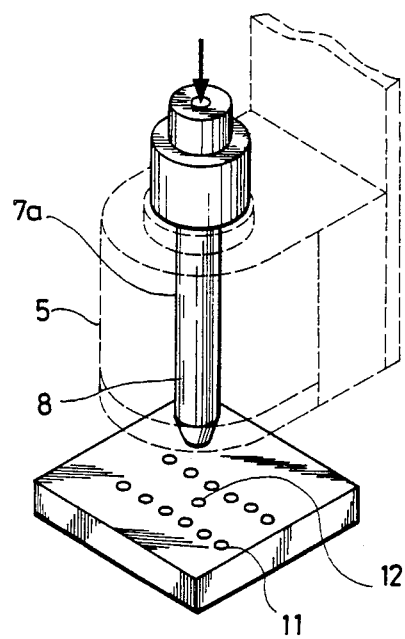
FIG. 2 illustrates a perspective view of an embodiment of the invention wherein an enlarging member is attached to a driving end of an industrial robot according to this invention.
Figure 3:
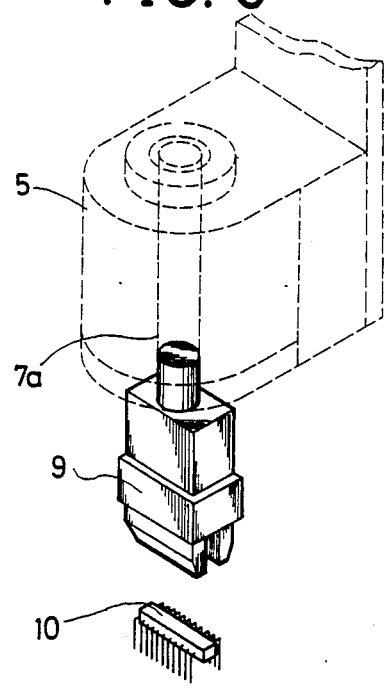
FIG. 3 illustrates a perspective view of an embodiment of the invention wherein a gripping member is attached in place of said enlarging member.

FIG. 2 shows an explanatory view of the holding member wherein an enlarging member 8 is attached to a driving end of the industrial robot and, FIG. 3 shows an explanatory view of the holding member 7 wherein a gripping member 9 is attached thereto instead of the enlarging member 8.

In both of FIGS. 2 and 3, numeral 8 designates the enlarging member such as a microscope and the like which is insertable into a through-hole 7a of the holding member. Numeral 9 designates the gripping member or manipulating device which is insertable into the through-hole 7a instead of the enlarging member 8. Numeral 10 designates a work which is grasped by the gripping member 9. Numeral 11 designates a pallet with a face for assembling the grasped work 10 thereon and has a reference hole 12 for assembling.

Referring now, the operation of the robot will be explained in accordance with FIG. 1 and FIG. 2.

The operator inserts the enlarging member 8 in the through-hole 7a and watches the reference hole 12 which is provided upon a certain position of the pallet 11 from the upside of the enlarging member 8, and transfers the driving end of the industrial robot so as to align the center of the reference hole 12 with the center of the enlarging member 8. Thereafter, the industrial robot is taught the coordinate data.

Next, the operator attaches the gripping member 9 to the through-hole 7a, as shown in FIG. 3 and furthermore, transfers the grasped work 10 according to the taught coordinate data while keeping the grasped state and corrects the vertical distance between the work and the pallet 11 and thus, teaches an accurate assembling coordinate data.

Meanwhile, the embodiment shows an example in which the through-hole 7a is provided in the holding member 7, the enlarging member 8 is mounted to the through hole 7a, and the watching operation is executed by watching the reference hole 12 from just above the enlarging member 8. But, even if a microscope which incorporates an optical refractive device such as a prism is employed and the watching operation is executed from a direction except the right-angled direction, the same effect will be obtained.

Meanwhile, by attaching an optical signal transmitting device instead of the enlarging member 8, it becomes possible to operate the industrial robot from a remote position. Moreover, by employing a transducer for changing an optical signal into an electrical signal and a computer instead of watching, it becomes possible to automatically align the center of the reference hole 12 with the center of the enlarging member 8. In these embodiments, the assembling reference hole 12 is previously provided on the pallet 11, but the same effect will be obtained even with a viewable mark of unevenness or the like.

As set forth above, in this invention, a position correction and a position teaching is executed by mounting an optical magnifying device to a through-hole for mounting a gripping member and by watching and admitting a magnified image view of the reference hole for assembling by means of an optical magnifying device. Therefore, the teaching operation can be carried out quite easily and with high accuracy.

What we claim is:

1. In an industrial robot having a movable arm which undergoes movement according to taught position data to manipulate a workpiece: support means carried by the arm and having means therein defining a through-hole; an optical magnifying device replaceably mounted in the through-hole and operative to effect initial alignment of the arm is a certain position so that position data can be produced to instruct the industrial robot to move the arm to the certain position; and a manipulating device replaceably mounted in the through-hole in place of the optical magnifying device for manipulating a workpiece from the certain position according to taught position data.

2. An industrial robot according to claim 1; wherein the support means comprises a holding member rotatively disposed within the support means, the holding member having the through-hole extending therethrough.

3. An industrial robot according to claim 2; wherein the support means has bearings disposed around the holding member for rotatively supporting the holding member.

4. An industrial robot according to claim 1; wherein the optical magnifying device comprises a microscope.

5. An industrial robot according to claim 1; wherein the manipulating device comprises a gripping device for releasably grasping the workpiece.

6. An industrial robot according to claim 1; wherein the arm comprises a plurality of arm elements, and a plurality of articulated devices for rotatively connecting the arm elements with each other.

7. An industrial robot according to claim 6; wherein the support means is disposed at a distal end portion of one of the arm elements.

8. An industrial robot according to claim 1; wherein the optical magnifying device is replaceably inserted into the through-hole from the top side thereof.

9. An industrial robot according to claim 1; wherein the manipulating device is replaceably inserted into the through-hole from the bottom side thereof.

10. An industrial robot having an arm and being taught position data for controlling the movement of the arm comprising: support means provided on the arm and having means therein defining a through-hole; an optical magnifying device replaceably inserted into the through-hole for placing the arm in a certain position by aligning a center line of the optical magnifying device with a reference point so as to teach corresponding position data of the arm to the industrial robot; and a manipulating device replaceably inserted into the through-hole in place of the optical magnifying device such that the longitudinal center liner thereof coincides with the center line of the optical magnifying device, the manipulating device being movable with the arm according to the taught position data for manipulating a workpiece.

11. An industrial robot according to claim 10; wherein the support means comprises a holding member rotatively disposed within the support means, the holding member having the through-hole extending therethrough, 12. An industrial robot according to claim 11; wherein the support means has bearings disposed around the holding member for rotatively supporting the holding member.

13. An industrial robot according to claim 10; wherein the optical magnifying device comprises a microscope.

14. An industrial robot according to claim 10; wherein the manipulating device comprises a gripping device for releasably grasping the workpiece.

15. An industrial robot according to claim 10; wherein the arm comprises a plurality of arm elements, and a plurality of articulated devices for rotatively connecting the arm elements with each other.

16. An industrial robot according to claim 15; wherein the support means is disposed at a distal end portion of one of the arm elements.

17. A control method of an industrial robot having an arm and being taught position data for controlling the movement of the arm, the method comprising the steps of:

inserting an optical magnifying device into a through-hole provided on the arm;

aligning an optical axis of the optical magnifying device with a reference point by moving the arm;

teaching position data representative of the aligned position of the arm to the industrial robot;

inserting a manipulating device into the through-hole in place of the optical magnifying device; and moving the arm according to the taught position data of the arm to manipulate a workpiece held by the manipulating device.

18. A control method of an industrial robot according to claim 17, further comprises the steps of:

adjusting the vertical distance between the workpiece held by the manipulating device and the reference point after the steps of moving the arm; and teaching position data representative of the adjusted vertical distance to the industrial robot.

* * * * *